(12) United States Patent
Wang et al.

(10) Patent No.: US 10,970,940 B2
(45) Date of Patent: Apr. 6, 2021

(54) TICKET CHECKING DEVICE, TICKET CHECKING METHOD, AND OCCUPANT SEAT POSITION

(71) Applicant: BOE TECHNOLOGY GROUP CO., LTD., Beijing (CN)

(72) Inventors: Xin Wang, Beijing (CN); Jianhua Du, Beijing (CN); Fan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/711,812

(22) Filed: Dec. 12, 2019

(65) Prior Publication Data

US 2020/0118351 A1    Apr. 16, 2020

Related U.S. Application Data

(63) Continuation of application No. PCT/CN2019/074026, filed on Jan. 30, 2019.

(30) Foreign Application Priority Data

Apr. 25, 2018    (CN) .......................... 201810386778.9

(51) Int. Cl.
    *G07B 11/02*    (2006.01)
(52) U.S. Cl.
    CPC .................................. *G07B 11/02* (2013.01)
(58) Field of Classification Search
    CPC .............................. G07B 11/00; G07B 11/02
    See application file for complete search history.

(56) References Cited

U.S. PATENT DOCUMENTS

| | | | | |
|---|---|---|---|---|
| 2003/0052167 A1* | 3/2003 | Hilton | ...................... | G07B 1/00 235/449 |
| 2015/0120340 A1* | 4/2015 | Cheatham, III | ....... | G06Q 10/02 705/5 |
| 2016/0042485 A1* | 2/2016 | Kopel | .................... | G07C 9/215 705/13 |

FOREIGN PATENT DOCUMENTS

| | | |
|---|---|---|
| CN | 1588421 | 3/2005 |
| CN | 202534010 | 11/2012 |
| CN | 206991385 | 2/2018 |
| CN | 208027424 | 10/2018 |
| CN | 108765588 | 11/2018 |
| JP | 2003281240 | 10/2003 |
| JP | 4048068 | 2/2008 |

OTHER PUBLICATIONS

International Search Report and Written Opinion dated Apr. 15, 2019 for PCT Patent Application No. PCT/CN2019/074026.

* cited by examiner

*Primary Examiner* — Laura A Gudorf
(74) *Attorney, Agent, or Firm* — Thomas|Horstemeyer, LLP

(57) ABSTRACT

The present disclosure relates to the field of ticket checking technologies, and provides a ticket checking device including an identifier and a control unit; the identifier is configured to identify ticket surface information of a ticket presented by a user; and the control unit is configured to compare the ticket surface information identified by the identifier with preset ticket surface information corresponding to the seat.

15 Claims, 5 Drawing Sheets

TICKET CHECKING DEVICE, TICKET CHECKING METHOD, AND OCCUPANT SEAT POSITION

CROSS REFERENCE TO RELATED APPLICATIONS

The present application is a bypass continuation application of PCT Patent Application No. PCT/CN2019/074026, filed on Jan. 30, 2019, which claims the benefit of and priority to Chinese Patent Application No. 201810386778.9, filed on Apr. 25, 2018, the entire disclosures of which are hereby incorporated as a part of the present application by reference.

TECHNICAL FIELD

The present disclosure relates to the field of ticket checking technologies and, in particular, relates to a ticket checking device, a ticket checking method, and a passenger seat.

BACKGROUND

People usually choose public transport, such as trains, buses, ships, or planes, to travel. In order to ensure that passengers take the correct schedules and seats/cabins, flight or vehicle attendants are required to check tickets at the time of passengers boarding a plane or boarding a vehicle to ensure that each passenger uses the seat that matches the ticket purchased. In addition, in order to avoid uncivilized behavior, such as fare evasion, transport attendants may also conduct multiple midway ticket checking. Beyond that, on many occasions, such as cinemas, theaters, etc., similar means are needed to ensure that people take their seat according to the number on the ticket.

The above information disclosed in the Background section is only for enhancement of understanding of the background of the present disclosure, and thus it may include information that does not constitute a prior art known to those of ordinary skill in the art.

SUMMARY

The disclosure relates to a ticket checking device, a ticket checking method, and a passenger seat.

The additional aspects and advantages of the present disclosure will be partly set forth in the following description, and will partly become apparent from the description, or may be learned from practice of the present disclosure.

According to an aspect of the present disclosure, a ticket checking device is provided, including:

an identifier configured to identify ticket surface information of a ticket presented by a user; and a control unit configured to compare the ticket surface information identified by the identifier with preset ticket surface information corresponding to the seat.

In an exemplary embodiment of the present disclosure, the control unit sends alarm information when the ticket surface information identified by the identifier is inconsistent with the preset ticket surface information.

In an exemplary embodiment of the present disclosure, the identifier includes:

an image acquisition unit configured to acquire a ticket surface image on a physical ticket;

an image processing unit configured to extract ticket surface information from the ticket surface image; and the control unit includes an information comparing unit configured to compare the ticket surface information with the preset ticket surface information.

In an exemplary embodiment of the present disclosure, the ticket checking device further includes:

a receiving slot configured to accommodate a physical ticket.

In an exemplary embodiment of the present disclosure, the ticket checking device further includes:

a physical ticket moving mechanism disposed in the receiving slot and configured to drive the physical ticket to move.

In an exemplary embodiment of the present disclosure, a bottom surface is provided in the receiving slot to receive the physical ticket, and the physical ticket moving mechanism includes:

a screw having a first terminal and a second terminal disposed opposite to the first terminal, the screw being disposed in a screw groove;

a nut having threads mating with threads of the screw, the nut mating with the screw groove to enable the screw groove to limit rotation of the nut, and the nut being capable of contacting the physical ticket; and a drive motor electrically connected to the control unit, a drive shaft of the drive motor being coupled to the second terminal for driving the screw to rotate and to drive the nut and the physical ticket to move.

In an exemplary embodiment of the present disclosure, the physical ticket moving mechanism further includes:

a contact switch electrically connected to the control unit, the contact switch being disposed on a side of the nut that is in contact with the physical ticket, and configured to cause the control unit to control the drive motor to move the physical ticket to the receiving slot, in response to sensing that the physical ticket is placed in the receiving slot.

In an exemplary embodiment of the present disclosure, the ticket checking device further includes:

a ticket collecting button electrically connected to the control unit, and the control unit controls the drive motor to start moving the physical ticket out of the receiving slot after the user presses the ticket collecting button.

In an exemplary embodiment of the present disclosure, the ticket checking device further includes:

an electronic tag configured to display the preset ticket surface information corresponding to the seat.

In an exemplary embodiment of the present disclosure, the electronic tag is further configured with a corresponding identification code of the preset ticket surface information, and a user terminal can scan the identification code to obtain the preset ticket surface information of a preset ticket; and the control unit is configured to compare the preset ticket surface information identified by the user terminal with ticket surface information that has been bound by the user terminal.

In an exemplary embodiment of the present disclosure, the control unit is further configured to send prompt information according to the preset ticket surface information, and the electronic tag displays the prompt information under control of the control unit.

In an exemplary embodiment of the present disclosure, the control unit is further configured to send control information when the ticket surface information is consistent with the preset ticket surface information, and the ticket checking device further includes:

a seat controller configured to control the seat to perform responding action according to the control information.

In an exemplary embodiment of the present disclosure, the control unit is further configured to send prompt information according to the preset ticket surface information, and the ticket checking device further includes:

a prompting device configured to send a prompt according to the prompt information.

In an exemplary embodiment of the present disclosure, the ticket checking device further includes:

a memory configured to correspondingly store the seat and the preset ticket surface information.

According to an aspect of the present disclosure, a ticket checking method is provided, including:

presetting ticket surface information to a corresponding seat to form preset ticket surface information; and checking whether ticket surface information of a ticket presented by a user matches the preset ticket surface information corresponding to the seat.

In an exemplary embodiment of the present disclosure, when the ticket surface information is inconsistent with the preset ticket surface information, an alert information is sent.

In an exemplary embodiment of the present disclosure, when the ticket surface information is consistent with the preset ticket surface information, a control information is sent to control the seat to perform responding action.

According to an aspect of the present disclosure, a passenger seat is provided, including:

a seat; and a ticket checking device according to any one of the above embodiments of the present disclosure.

In an exemplary embodiment of the present disclosure, the passenger seat further includes:

a seat restraint device configured to perform action in response to the ticket checking device.

It should be understood that both the foregoing general description and the following detailed description are exemplary and explanatory only and are not restrictive of the disclosure.

This section provides an overview of various implementations or examples of the techniques described in this disclosure, and is not a comprehensive disclosure of the full scope or all features of the disclosed technology.

BRIEF DESCRIPTION OF THE DRAWINGS

The above and other features and advantages of the present disclosure will become more apparent from the detailed description of the exemplary embodiments by referring to the accompanying drawings. In order to more clearly illustrate the embodiments of the present disclosure or the technical solutions in the related art, the drawings used in the embodiments or the related art description will be briefly introduced below. It is understood that the drawings in the following description are only some of the embodiments of the present disclosure, and other drawings may be obtained from those skilled in the art without paying creative efforts.

DETAILED DESCRIPTION

Figure 1:
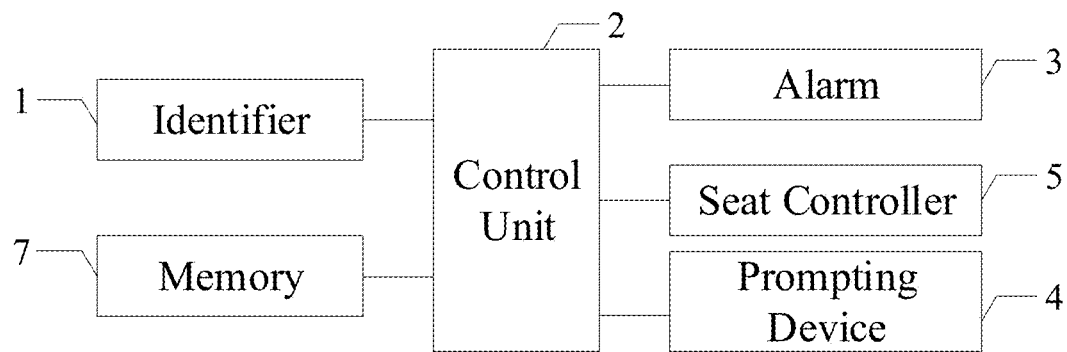
FIG. 1 is a schematic structural diagram of an embodiment of a ticket checking device of the present disclosure.

Exemplary embodiments will now be described more fully with reference to the accompanying drawings. However, the exemplary embodiments can be embodied in a variety of forms and should not be construed as being limited to the embodiments set forth herein. Rather, these embodiments are provided to make the present disclosure more thorough and complete, and to fully convey the concept of the exemplary embodiments to those skilled in the art. In the figures, the same reference numerals in the drawings denote the same or similar structures, and thus their detailed description will be omitted.

The present disclosure first provides a ticket checking device, referring to FIG. 1 which is a schematic structural diagram of an embodiment of a ticket checking device of the present disclosure. The ticket checking device may include an identifier 1, a control unit 2, an alarm 3, and the like. The identifier is configured to identify ticket surface information on the ticket presented by the user. The control unit is configured to compare the ticket surface information identified by the identifier with preset ticket surface information corresponding to the seat. The identifiers 1 can be set up on the seats in a one-to-one correspondence.

The control unit 2 can also be configured to send alarm information when the ticket surface information is inconsistent with the preset ticket surface information; the alarm 3 can be configured to issue an alarm based on the alarm information.

It should be understood that in the present disclosure, the term "seat" may be any fixed location that requires a ticket to occupy. For example, in a train seat car, a seat is a passenger's seat; in a train sleeper car, a seat is a passenger's bunk, and so forth. Of course, on a plane, a seat can be a seat in economy class, a seat in first class, and/or a seat in business class. In cinemas, theaters, etc., a seat can be a seat for an audience. In exemplary embodiments of the present disclosure, a seat is described as a seat of a train seat car as an example, but the present disclosure is not limited thereto.

It should also be understood that the term "set up on a seat" may mean that it is set up integrally with the seat, and may also be set up separately from the seat but in a group/set with the seat. For example, in an exemplary embodiment of the present disclosure, the identifier 1 is mounted on the back of the backrest of each seat, that is, the identifier 1 faces the passenger in a rear row, and the identifier 1 has a one-to-one correspondence with the seat it faces, thus facilitating the passenger to place and take the ticket. In addition, in other exemplary embodiment of the present disclosure, the identifier 1 may also be mounted on the armrest on the left or right side of the seat as long as it is in one-to-one correspondence with the seat, and is convenient for the passenger to observe and take the ticket.

The ticket checking device may include a memory 7 in which all the preset ticket surface information of the train is stored. The identifier 1 is connected to the memory 7, and each identifier 1 can retrieve a piece of preset ticket surface information corresponding to the seat corresponding to the identifier 1. In an embodiment of the present disclosure, all of the preset ticket surface information of the train may be stored in the memory in the form of an information database.

In an exemplary embodiment of the present disclosure, the identifier 1 includes two types, i.e. a physical ticket identifier and an electronic ticket identifier. Of course, those skilled in the art can understand that the identifier 1 can also be one of a physical ticket identifier and an electronic ticket identifier.

The physical ticket identifier is described in detail below.

Figure 2:
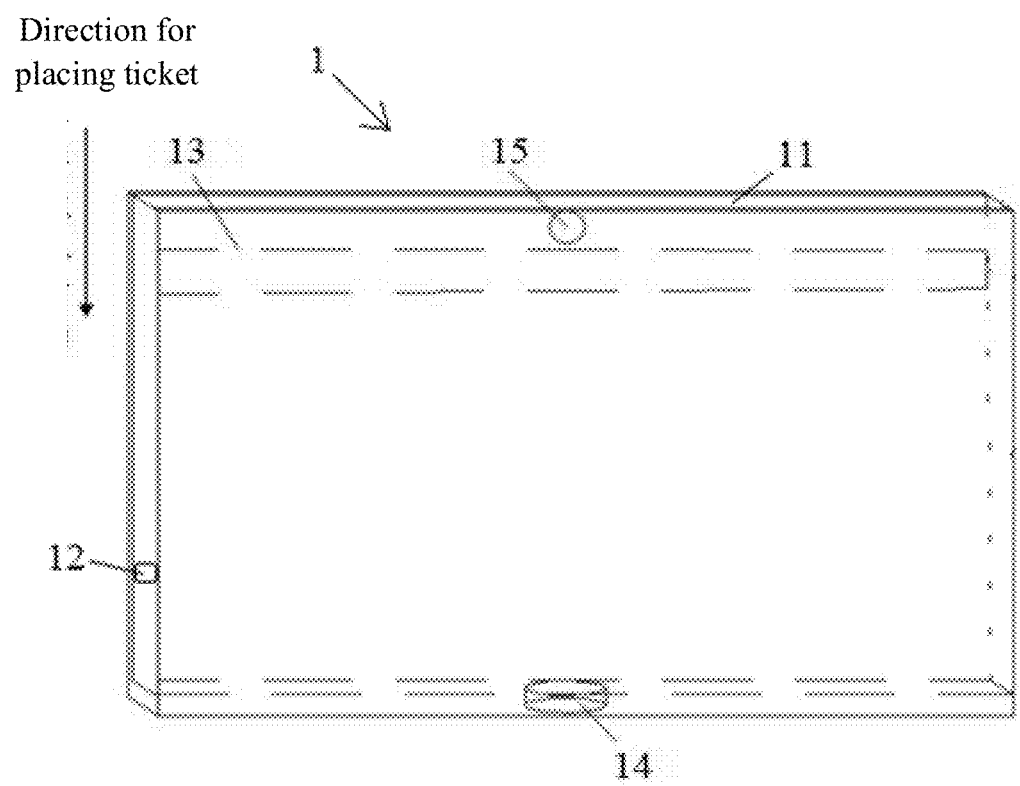
FIG. 2 is a schematic structural diagram of an embodiment of a physical ticket identifier.

Referring to the structural diagram of an embodiment of a physical ticket identifier shown in FIG. 2, the physical ticket identifier includes a housing in which a receiving slot 11 for accommodating the physical ticket 6 is disposed, and the opening of the receiving slot 11 faces upward, so that the physical ticket 6 can be placed into the receiving slot 11 from the top to bottom at the opening. The arrangement of the receiving slot 11 is not limited to the above description and, for example, the opening of the receiving slot 11 may be disposed to the right or the left so that the physical ticket 6 can be placed into the receiving slot 11 from right to left or from left to right at the opening.

An image acquisition unit may be disposed in the receiving slot 11, and the image acquisition unit may be configured to acquire a ticket surface image on the physical ticket 6. The image acquisition unit is electrically connected to an image processing unit, and the image processing unit is electrically connected to an information comparing unit.

In an exemplary embodiment of the present disclosure, the image acquisition unit may include a built-in light source, a camera, and a photoelectric converter. The ticket is illuminated by the light source. The ticket is of a simple form, with the main part being words of a font generally in black. Objects in different colors can reflect visible lights of different wavelengths. White objects can reflect visible light of various wavelengths, and black objects absorb visible light of various wavelengths. A scan lens 13 illuminates the ticket, then receives the reflected light by a photoelectric converter, and converts the brightness and darkness of the reflected light into digital signals for transmitting the same to the image processing unit. The image processing unit may extract the ticket surface information from the ticket surface image and transmit the ticket surface information to the information comparing unit. The information comparing unit may compare the ticket surface information with the preset ticket surface information to complete the ticket checking.

Figure 3:
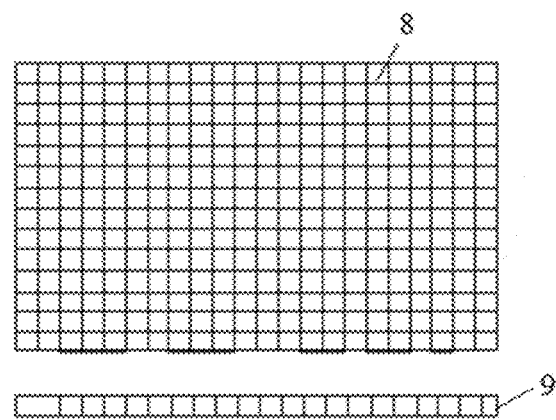
FIG. 3 is a schematic diagram of a pixel set formed by a progressive scan of a physical ticket identifier.

In another exemplary embodiment of the present disclosure, the image acquisition unit may include a scan lens 13 to perform progressive scan and imaging on the ticket. Referring to the pixel set diagram formed by the progressive scan, as shown in FIG. 3, the scan lens scans once to form one frame of image 9. The one frame of image 9 includes a plurality of pixels 8, and the scanned image is composed of a plurality of frames of images. Finally the digital signals are transmitted to the image processing unit. The image processing unit may extract the ticket surface information from the ticket surface image and transmit the ticket surface information to the information comparing unit. The information comparing unit may compare the ticket surface information with the preset ticket surface information to complete the ticket checking.

In an exemplary embodiment of the present disclosure, a blocking indicator light 15 is further disposed at the opening of the receiving slot 11. The blocking indicator light 15 is electrically connected to the control unit 2. When a physical ticket is placed in the receiving slot 11, the blocking indicator light 15 is blocked. The blocking indicator 15 transmits a blocking signal to the control unit 2, and the control unit controls the movement of a physical ticket moving mechanism 14 to move the physical ticket 6 into the receiving slot 11.

The physical ticket identifier may further include a physical ticket moving mechanism 14 disposed in the receiving slot 11 to drive the physical ticket 6 to move.

In an exemplary embodiment the present disclosure, the physical ticket moving mechanism 14 may be disposed at the bottom of the receiving slot 11, and the physical ticket moving mechanism 14 may include a drive motor, a connecting rod, and the like. The connecting rod is vertically disposed, and the connecting rod has a first terminal (upper terminal) and a second terminal (lower terminal) opposite to the first terminal. The first terminal can contact the physical ticket 6, and the second terminal is connected to the drive shaft of the drive motor. The drive motor can be a linear motor, and the control terminal of the drive motor is electrically connected to the control unit 2. Under the control of the control unit 2, the drive motor can drive the connecting rod and the physical ticket 6 to move.

The structure of the physical ticket moving mechanism 14 is not limited to the above description. For example, the drive shaft of the drive motor may be directly brought into contact with the physical ticket 6 without a connecting rod.

Figure 4:
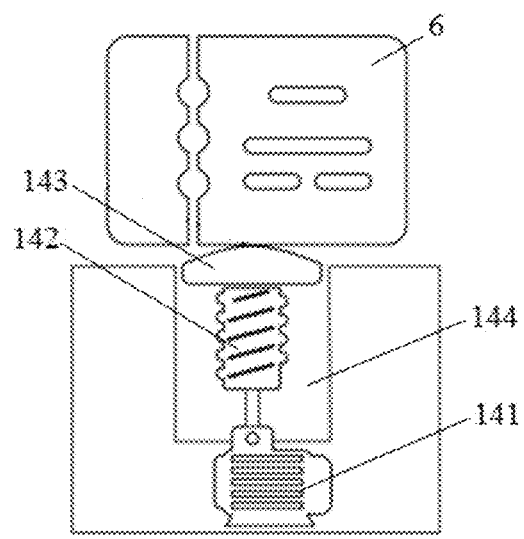
FIG. 4 is a schematic structural diagram of a physical ticket moving mechanism of FIG. 2 in an extended state.
Figure 5:
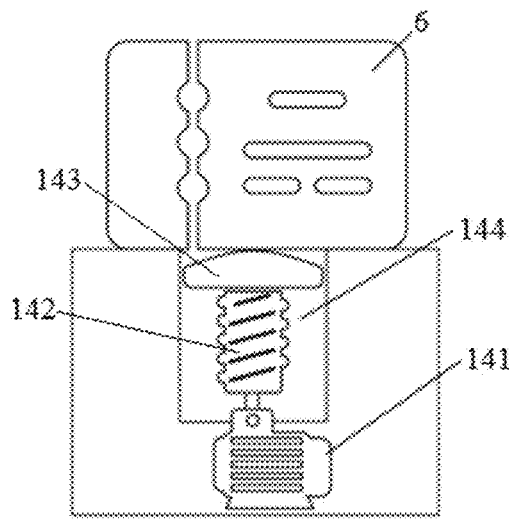
FIG. 5 is a schematic structural diagram of a physical ticket moving mechanism of FIG. 2 in a retracted state.

Referring to FIG. 4 and FIG. 5, the structure of the physical ticket moving mechanism 14 is shown. The drive motor may be a rotary motor 141 and the connecting rod may be a screw 142, wherein the drive shaft of the rotary motor 141 is connected with the screw 142 and the screw 142 has threads mating with threads of a nut 143. The nut 143, the screw 142, and the nut 143 are all disposed in the vertical screw groove 144 at the bottom of the receiving slot 11. The screw groove 144 can limit the nut 143. During the rotation of the screw 142, the nut 143 does not rotate but moves up and down. Thus, the physical ticket 6 is moved up and down with the nut 143. Of course, when the opening of the receiving slot 11 is provided on the right side or the left side, the physical ticket moving mechanism 14 may be disposed on the left side or the right side of the receiving slot 11. That is, the physical ticket moving mechanism 14 and the opening of the receiving slot 11 are generally disposed opposite to each other.

A contact switch may be disposed at an upper terminal of the connecting rod (i.e., the first terminal), and the contact switch is electrically connected to the control unit 2. When the physical ticket 6 is placed in the receiving slot 11, it is sensed by the contact switch, and the contact switch transmits a turning-on signal to the control unit 2. The control unit 2 controls the drive motor to start moving the physical ticket 6 into the receiving slot 11. The contact switch can be a pressure sensor, a contact sensor, or the like.

In the case of the rotary motor 141 is employed, the contact switch may be disposed at the top terminal of the nut 143, that is, the position where the nut 143 is in contact with the physical ticket 6.

In an exemplary embodiment of the present disclosure, the physical ticket moving mechanism 14 further includes a "ticket retrieving" or "ticket collecting" button that is electrically connected to the control unit 2. The ticket collecting button is disposed at a side of the housing and protrudes from the housing. After the user presses the ticket collecting button 12, the ticket collecting button 12 transmits a ticket retrieving signal to the control unit 2, and the control unit 2 controls the drive motor to start to extend the drive shaft to move the physical ticket 6 out of the receiving slot 11.

Of course, those skilled in the art can understand that a "ticket placing" button can also be provided. After the user puts a part of the physical ticket 6 into the receiving slot 11, and presses the "ticket placing" button that is electrically connected to the control unit 2, the "ticket placing" button transmits a ticket placing signal to the control unit 2, and the control unit 2 controls the drive motor to start to retract the drive shaft to move the physical ticket 6 into the receiving slot 11.

In addition, the physical ticket moving mechanism 14 can also be arranged to be generally in a retracted state, that is, the drive shaft of the drive motor is generally in a retracted state, and the user can directly put the physical ticket into the receiving slot 11. When the user needs to retrieve the ticket, the user may press the ticket collecting button 12, and the drive shaft of the drive motor is extended to move the physical ticket out of the receiving slot 11. After a preset period of time, the drive shaft of the drive motor is retracted, so that the user can directly put into the physical ticket. It is also possible to sense that the drive shaft of the drive motor is retracted after the user has taken the physical ticket away by the contact switch.

The electronic ticket identifier will be described in detail below.

Figure 6:
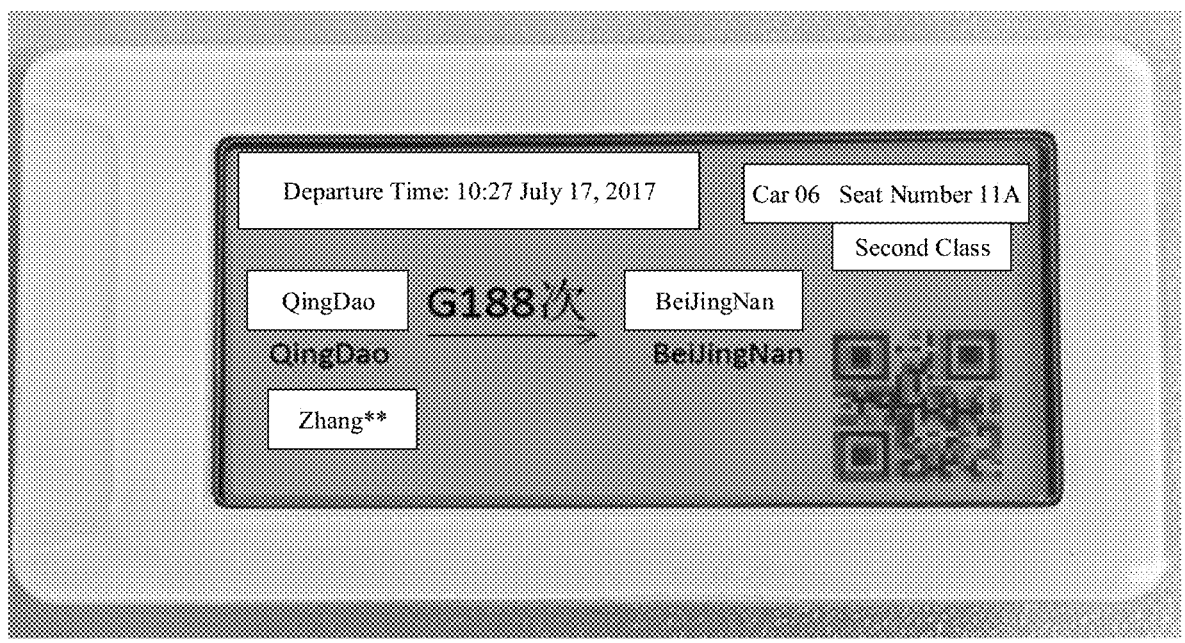
FIG. 6 is a schematic diagram of an electronic tag displayed by an electronic ticket identifier.

Referring to the schematic diagram of an electronic tag displayed by the electronic ticket identifier, as shown in FIG. 6, the electronic ticket identifier may include a display unit disposed outside the housing and a receiving unit connected to the display unit. The display unit is disposed outside the side wall of the receiving slot away from the seat back. The display unit can be configured to display an electronic tag, and the electronic tag is configured to display preset ticket information corresponding to the seat. The display unit can be a liquid crystal display, an LED display, an OLED display, or the like. The display unit can also be configured to display the comparison result received by the receiving unit. The electronic tag is further configured with a corresponding identification code of the preset ticket information, and the user terminal can scan the identification code to obtain preset ticket surface information of the preset ticket. The control unit is configured to compare the preset ticket surface information identified by the user terminal with the ticket information that has been bound to the user terminal.

In an exemplary embodiment of the present disclosure, the electronic tag is train ticket information, and the electronic tag can display a departure time (including year, month, day, hour, and minute), a starting station, an arrival station, a train number, a car number, a seat number, a seat class, a last name of the ticket purchaser, the identification code corresponding to the preset ticket information of the seat, and the like, and the identification code may be a two-dimensional code, a barcode, or the like.

The user of the electronic ticket can scan the two-dimensional code on the electronic tag through an APP on the mobile terminal, and the preset ticket surface information can be obtained through the electronic tag. The server will compare the electronic ticket information corresponding to the mobile terminal with the obtained preset ticket surface information, and send a consistent or inconsistent comparison result. The receiving unit receives the comparison result of the ticket surface information of electronic ticket and the preset ticket surface information of the electronic tag from the server, and the comparison result includes which part is inconsistent, for example, the name is inconsistent, the number of the car is inconsistent, the seat is inconsistent, and the like. The user terminal may send the preset ticket surface information and the ticket information that has been bound to the user terminal to the control unit, and the control unit can compare the preset ticket surface information identified by the user terminal with the ticket information that has been bound to the user terminal. The control unit is further configured to send prompt information according to the preset ticket surface information, and the electronic tag displays the prompt information under the control of the control unit. The prompt information can be an arrival prompt, a departure prompt, a remaining time prompt, and the like.

The ticket checking device may further include a seat controller 5. When the ticket surface information is consistent with the preset ticket surface information, the control unit 2 sends control information to the seat controller 5, and the seat controller 5 controls the seat to perform responding action in response to the control information.

In an exemplary embodiment of the present disclosure, the responding action is that the seat is stowed or dropped. The seat controller 5 may be an electric cylinder, a gas cylinder or an oil cylinder, etc., disposed between the seat and the ground to drive the seat to be stowed or dropped. The seat controller 5 can further prevent the passenger from sitting in the wrong seat, and can avoid the situation that the seat is maliciously occupied by another person. In other embodiments of the present disclosure, the responding action may further include a release/recovery blocking device or the like, and the disclosure is not limited thereto.

The ticket checking device may further include a prompting device 4, wherein the prompting device 4 may be configured to send a prompt according to the prompt information. In an exemplary embodiment of the present disclosure, the prompting device 4 may be a voice prompting device 4, and the prompt may be an arrival prompt, a departure prompt, a remaining time prompt, and the like. The ticket checking device records the station to which the seat passenger is to arrive and the arrival time. When the train is about to arrive, the control unit 2 can also send a piece of prompt information according to the ticket surface information, and the prompting device 4 sends an arrival prompt according to the prompt information to prompt the passenger that he is about to arrive, and to prepare for the luggage, thereby avoiding passengers missing the station. For sleeper cars, it can eliminate the need for the train attendants' reminder, thus reducing the workload of the train attendants.

The specific working process of the present disclosure will be described in detail below.

Figure 7:
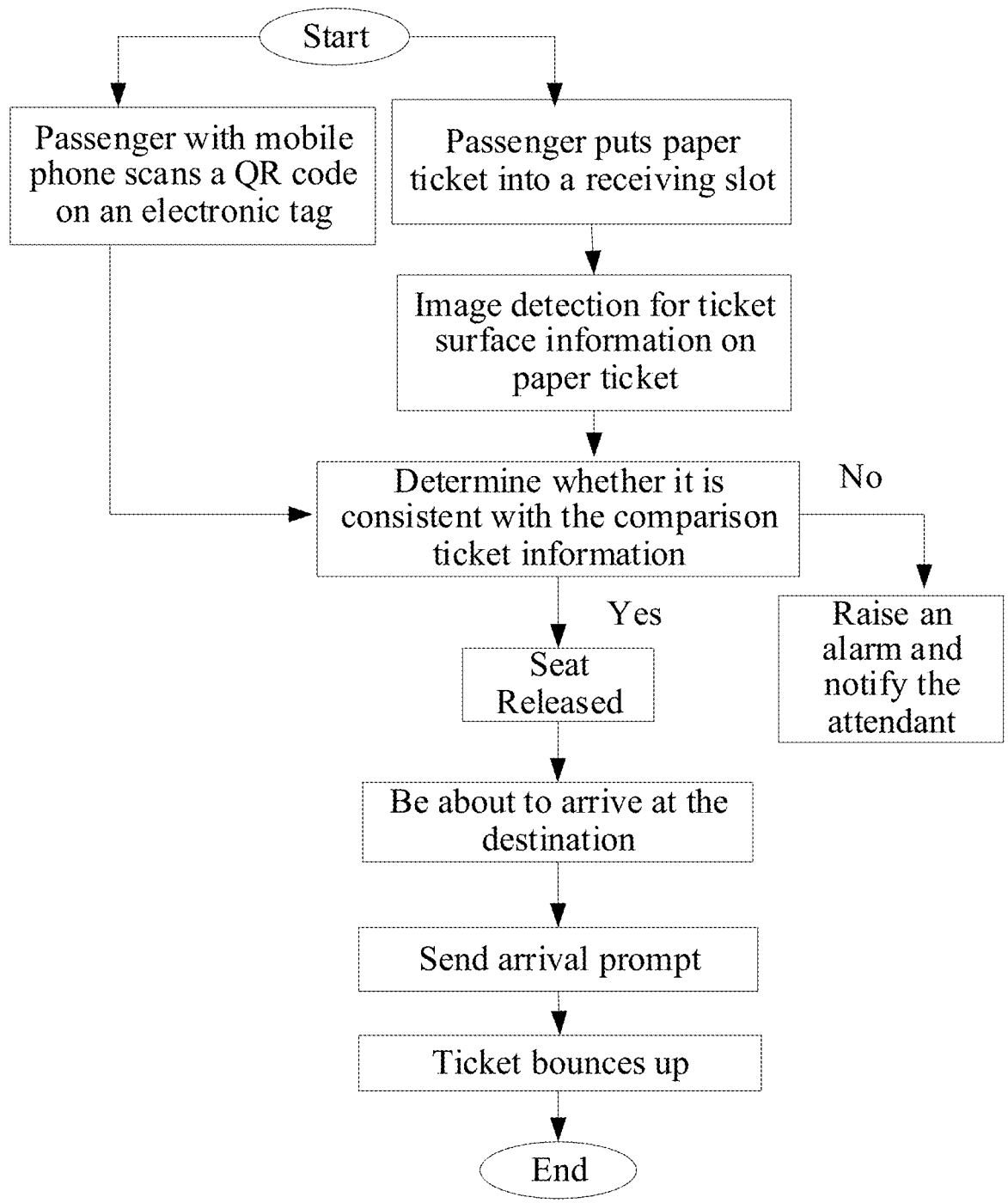
FIG. 7 is a detailed working flow chart of a ticket checking device of the present disclosure.

Referring to the specific working flow chart of the ticket checking device shown in FIG. 7, after a passenger boards a train, the physical ticket passenger inserts a physical ticket into the receiving slot 11, and the image acquisition unit on the identifier 1 acquires a ticket surface image on the physical ticket, and the image processing unit extracts the ticket surface information from the ticket surface image, and the information comparing unit will compare the ticket surface information with preset ticket surface information. When the ticket surface information is inconsistent with the preset ticket surface information, the alarm device can raise an alarm to notify a train attendant. When the ticket surface information is consistent with the preset ticket surface information, the seat is controlled to be released, so that the passenger can be seated. When it is about to arrive at the destination, an arrival prompt is issued, and the ticket is bounced up to end the trip. A passenger of an electronic ticket scans the two-dimensional code on the electronic tag, the server determines whether the ticket surface information is consistent with the preset ticket surface information, and transmits the comparison result to the receiving unit. According to the comparison result, the control unit 2 controls: when the ticket surface information is inconsistent with the preset ticket surface information, the alarm device issues an alarm to notify the train attendant; when the ticket surface information is consistent with the preset ticket surface information, the seat is controlled to be released, so that the passenger can be seated; when it is about to arrive at the destination, an arrival prompt is issued, and the ticket is bounced up to end the trip.

Figure 8:
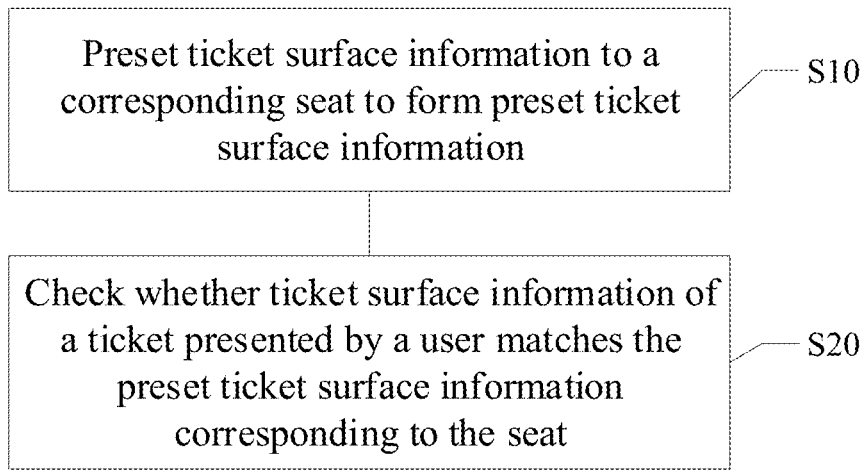
FIG. 8 is a schematic flow chart of a ticket checking method of the present disclosure.

Further, the present disclosure further provides a flow chart corresponding to the ticket checking method of the above-mentioned ticket checking device, and referring to the ticket checking method shown in FIG. 8, the ticket checking method may include the following steps:

in S10, ticket surface information is preset to a corresponding seat to form preset ticket surface information;

in S20, it is checked whether a ticket surface information of a ticket presented by a user matches the preset ticket surface information corresponding to the seat.

In an exemplary embodiment of the present disclosure, if the ticket surface information is inconsistent with the preset ticket surface information, an alert information is sent.

In an exemplary embodiment of the present disclosure, the ticket checking method further includes: if the ticket surface information is consistent with the preset ticket surface information, sending control information to control the seat to perform responding action.

In an exemplary embodiment of the present disclosure, the ticket checking method further includes: sending prompt information according to the ticket surface information to prompt the passenger to arrive at the station, and to prepare for departure, or to prompt a viewer that the show is about to start, or the show is about to end, and the like.

The specific details of the above-mentioned ticket checking method have been described in detail in the corresponding ticket checking device, and therefore it will not be described herein.

Figure 9:
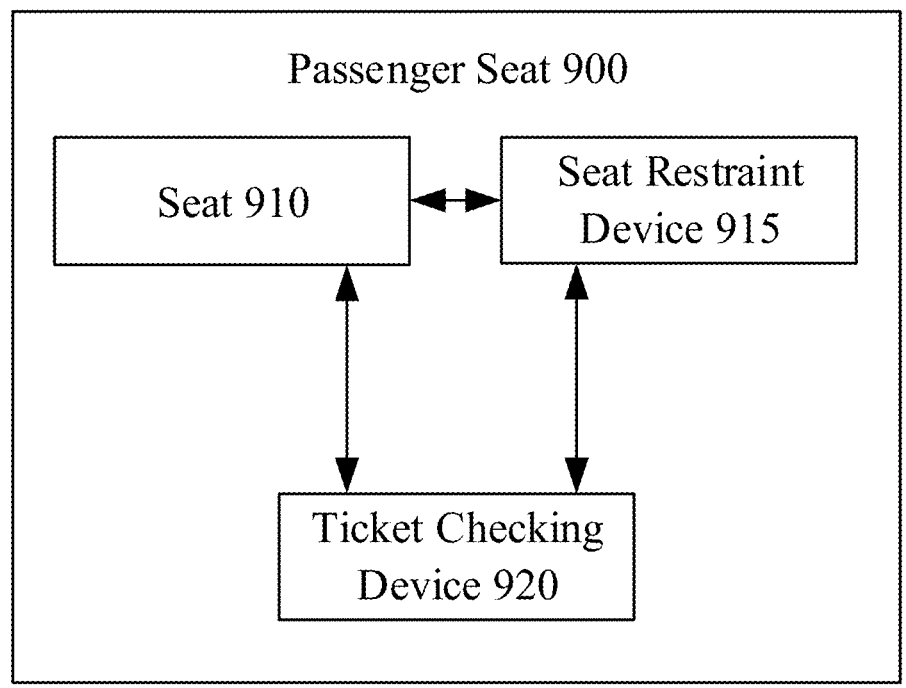
FIG. 9 is a schematic diagram of a passenger seat of the present disclosure.

According to another aspect of the present disclosure, a passenger seat is also provided. FIG. 9 shows a schematic diagram of the passenger seat 900 of the present disclosure.

Referring to FIG. 9, in an embodiment of the present disclosure, the passenger seat 900 may include a seat 910 and a ticket checking device 920. The seat 910 may be a seat, a bunk, etc., for accommodating a user, which is not specifically limited in the present disclosure. The ticket checking device 920 may be a ticket checking device according to the foregoing embodiment of the present disclosure. For specific details, the foregoing embodiments may be referred to, which will not be repeated herein.

According to an embodiment of the present disclosure, the passenger seat may also include a seat restraint device 915 that performs action in response to the ticket checking device 920. For example, in response to a seat controller of the ticket checking device 920 (not shown, see the previous embodiment), the seat restraint device 915 performs a corresponding action to control the seat 910, for example, to make the seat 910 raised or lowered, or to release or retract a blocking device etc., thereby allowing or prohibiting the seat 910 to be used. It should be understood that the present disclosure is not limited thereto, and the seat restraint device 915 may also operate in response to other control signals of the ticket checking device 920. For example, when the ticket checking device 920 raises an alarm, the seat restraint device 915 can raise the seat 910 or release the blocking device in response to the alarm, thereby inhibiting the person who has ticket surface information inconsistence with the seat information from using the seat 910.

According to embodiments of the present disclosure, the control unit may be implemented by hardware, or software, or a combination of hardware and software. For example, the control unit may be implemented by one or more logical circuits that are configured to perform corresponding operations of the ticket checking device. The control unit may include one or more processors to execute instructions to perform all or part of the operations that the control unit is configured to perform. In another example, the control unit may be implemented by a software algorithm in a computer readable instructions, which when being executed by a processor of the ticket checking device, causes the ticket checking device to perform the corresponding operations.

Other units/modules of the present disclosure may be implemented in a similar manner, one of ordinary skill in the art will also understand that multiple ones of the above described modules/units may be combined as one module/unit, and each of the above described modules/units may be further divided into a plurality of sub-modules/sub-units.

It can be known from the above technical solutions, the present disclosure has at least one of the following advantages and positive effects.

In the ticket checking device of the present disclosure, the ticket surface information of the ticket presented by the user can be identified by the identifier, and the control unit is configured to compare the ticket surface information identified by the identifier with the preset ticket surface information corresponding to the seat. By checking tickets through the ticket checking devices, the attendants do not need to check the tickets, thereby saving the workload of the attendants.

The features, structures, or characteristics described above may be combined in any suitable manner in one or more embodiments, and if possible, the features discussed in the various embodiments are interchangeable. In the description above, numerous specific details are set forth to provide a thorough understanding of the embodiments of the present disclosure. However, it will be appreciated by those skilled in the art that the technical solutions of the present disclosure may be practiced without one or more of the specific details, or other methods, components, materials, etc., may be employed. In other instances, well-known structures, materials or operations are not shown or described in detail to avoid obscuring aspects of the present disclosure.

Although the relative terms such as "on" and "below" are used in the specification to describe the relative relationship of one component to another component as illustrated, these terms are used in this specification for convenience only, for example, according to the exemplary direction illustrated in the accompanying drawings. It will be understood that if the device as illustrated is flipped upside down, the component described "on" will become the component "below". Other relative terms such as "high", "low", "top", "bottom", "left", and "right" also have similar meanings. When a structure is "on" other structure, it may mean that a structure is integrally formed on other structure, or that a structure is "directly" disposed on other structure, or that a structure is "indirectly" disposed on other structure through another structure.

In the present specification, the terms "a", "an", "the", "said", and "at least one" are used to mean that there are one or more elements/components/etc. The terms "comprising", "including", and "having" are used to mean an open-ended inclusive meaning and are meant to mean that there may be other elements/components, etc. in addition to the listed elements/components/etc. The terms, "first", "second", and "third", etc., are used only as markers, without limiting the number of objects.

It should be understood that the present disclosure does not limit its application to the detailed structure and arrangement of the components presented in the specification. The present disclosure can have other embodiments and can be implemented or carried out in various forms. The foregoing variations and modifications are intended to fall within the scope of the present disclosure. It should be understood that the disclosure disclosed and defined in this specification extends to all alternative combinations of two or more individual features mentioned or apparent in the text and/or in the drawings. All of these different combinations constitute a number of alternative aspects of the present disclosure. The embodiments described in the specification are illustrative of the best mode of the present disclosure, and will enable those skilled in the art to utilize this disclosure.

What is claimed is:

1. A ticket checking device being configured on a seat, the ticket checking device comprising:
    an identifier configured to identify ticket surface information of a ticket presented by a user, wherein the identifier comprises:
        an image acquisition unit configured to acquire a ticket surface image on a physical ticket; and
        an image processing unit configured to extract ticket surface information from the ticket surface image;
    a control unit configured to:
        compare the ticket surface information identified by the identifier with preset ticket surface information corresponding to the seat; and
        send alarm information in response to the ticket surface information identified by the identifier being inconsistent with the preset ticket surface information;
        wherein the control unit comprises an information comparing unit configured to compare the ticket surface information with the preset ticket surface information;
    a receiving slot configured to accommodate the physical ticket, the receiving slot comprising a bottom surface that receives the physical ticket; and
    a physical ticket moving mechanism disposed in the receiving slot and configured to drive the physical ticket to move, wherein the physical ticket moving mechanism comprises:
        a screw having a first terminal and a second terminal disposed opposite to the first terminal, the screw being disposed in a screw groove;
        a nut having threads mating with threads of the screw, the nut mating with the screw groove to enable the screw groove to limit rotation of the nut, and the nut being capable of contacting the physical ticket; and
        a drive motor electrically connected to the control unit, a drive shaft of the drive motor being coupled to the second terminal for driving the screw to rotate and to drive the nut and the physical ticket to move.

2. The ticket checking device according to claim 1, wherein the physical ticket moving mechanism further comprises:
    a contact switch electrically connected to the control unit, the contact switch being disposed on a side of the nut that is in contact with the physical ticket, and configured to cause the control unit to control the drive motor to move the physical ticket to the receiving slot, in response to sensing that the physical ticket is placed in the receiving slot.

3. The ticket checking device according to claim 1, further comprising: a ticket collecting button electrically connected to the control unit, and the control unit is configured to control the drive motor to start moving the physical ticket out of the receiving slot in response to the user pressing the ticket collecting button.

4. A ticket checking device being configured on a seat, the ticket checking device comprising:
    an identifier configured to identify ticket surface information of a ticket presented by a user;
    a control unit configured to compare the ticket surface information identified by the identifier with preset ticket surface information corresponding to the seat, wherein the control unit is configured to send alarm information in response to the ticket surface information identified by the identifier being inconsistent with the preset ticket surface information; and
    an electronic tag configured to display the preset ticket surface information corresponding to the seat.

5. The ticket checking device according to claim 4, wherein:
    the electronic tag is further configured with a corresponding identification code of the preset ticket surface information, and a user terminal scans the identification code to obtain the preset ticket surface information of a preset ticket; and
    the control unit is configured to compare the preset ticket surface information identified by the user terminal with ticket surface information that has been bound by the user terminal.

6. The ticket checking device according to claim 4, wherein the control unit is further configured to send prompt information according to the preset ticket surface information, and the electronic tag displays the prompt information under control of the control unit.

7. The ticket checking device according to claim 1, wherein:
    the control unit is further configured to send control information in response to the ticket surface information being consistent with the preset ticket surface information; and
    the ticket checking device further comprises: a seat controller configured to control the seat to perform responding action according to the control information.

8. A ticket checking device being configured on a seat, the ticket checking device comprising:
    an identifier configured to identify ticket surface information of a ticket presented by a user;
    a control unit configured to compare the ticket surface information identified by the identifier with preset ticket surface information corresponding to the seat, wherein the control unit is further configured to send prompt information according to the preset ticket surface information; and
    a prompting device configured to send a prompt according to the prompt information.

9. The ticket checking device according to claim 1, wherein the ticket checking device further comprises: a memory configured to correspondingly store the seat and the preset ticket surface information.

10. The ticket checking device according to claim 1, wherein the ticket checking device is implemented in a passenger seat, the passenger seat comprising the seat.

11. The passenger seat according to claim 10, further comprising: a seat restraint device configured to perform an action in response to the ticket checking device.

12. The ticket checking device according to claim 4, wherein the ticket checking device is part of a passenger seat, the passenger seat comprising the seat.

13. The ticket checking device according to claim 12, wherein the passenger seat further comprises a seat restraint device configured to perform an action in response to the ticket checking device.

14. The ticket checking device according to claim 8, wherein the ticket checking device is part of a passenger seat, the passenger seat comprising the seat.

15. The ticket checking device according to claim 14, wherein the passenger seat further comprises a seat restraint device configured to perform an action in response to the ticket checking device.

\* \* \* \* \*